Dec. 29, 1964  G. PETERSON, JR  3,163,808
TIMED ELECTROMAGNETIC OSCILLATING TO ROTARY DRIVE
Filed Aug. 21, 1962  2 Sheets-Sheet 1

INVENTOR:
GEORGE PETERSON, JR.
BY
Howson & Howson
ATTYS.

Dec. 29, 1964     G. PETERSON, JR     3,163,808
TIMED ELECTROMAGNETIC OSCILLATING TO ROTARY DRIVE
Filed Aug. 21, 1962     2 Sheets-Sheet 2
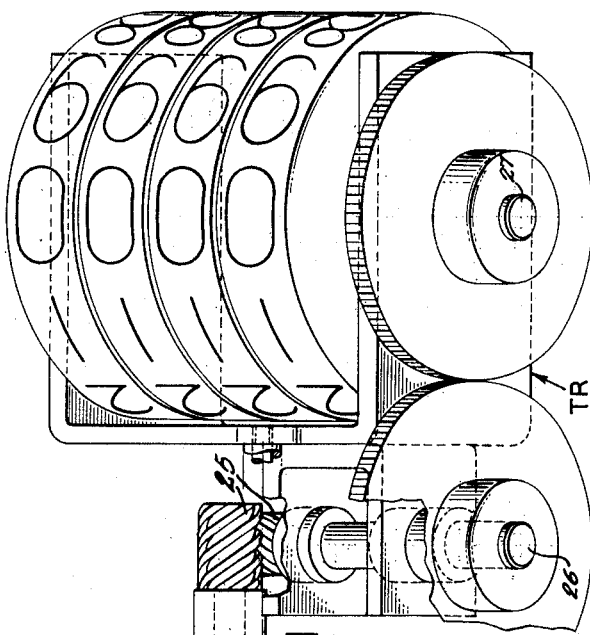
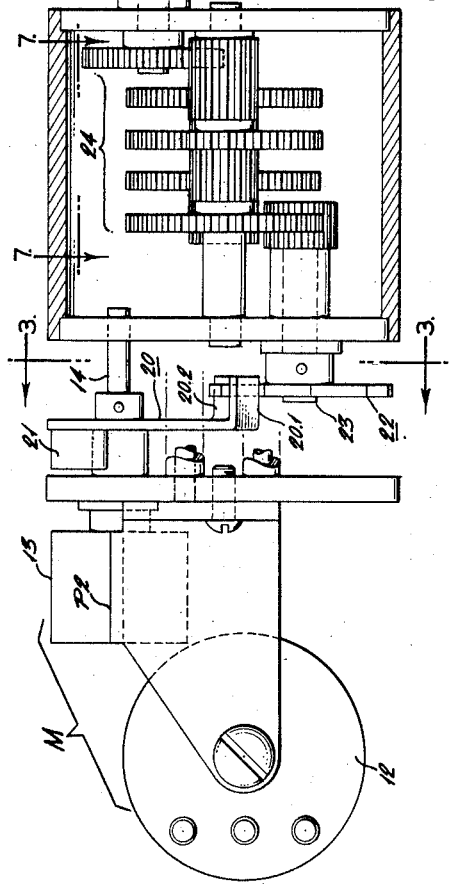
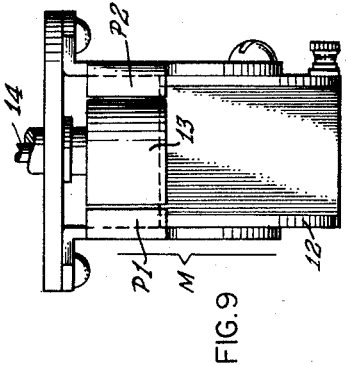
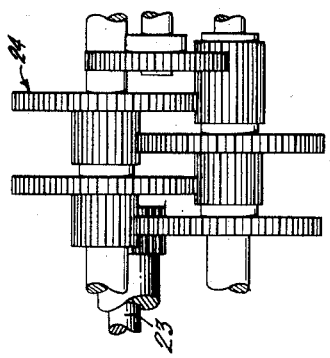
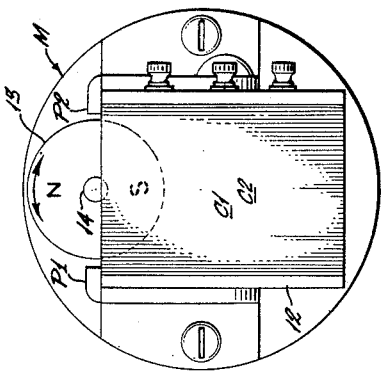
INVENTOR:
GEORGE PETERSON, JR.
BY
Howson & Howson
ATTYS.

United States Patent Office 3,163,808
Patented Dec. 29, 1964

3,163,808
TIMED ELECTROMAGNETIC OSCILLATING
TO ROTARY DRIVE
George Peterson, Jr., 319 S. Wayne Ave., Wayne, Pa.
Filed Aug. 21, 1962, Ser. No. 218,406
6 Claims. (Cl. 318—130)

This invention relates to an elapsed time indicator, particularly to one which uses an all-electric drive device which operates on a direct current power supply and creates impulses of great precision as to time duration to measure elapsed time periods.

Timing devices such as the familiar electric clocks operate in exact step with the pulses of alternating current. These devices measure time very accurately if the operating current pulses are accurately controlled. With a direct current source, as available from batteries in automobiles, aircraft and the like, the situation is very different. There have been few devices which would measure time accurately by direct current motivation, and practically none which were sufficiently inexpensive to be widely available.

Direct current devices suffer from a number of problems. Many have involved motors with springs which are variable in accuracy and breakable. Many have involved contact switches which were subject to wear, pitting or breakage. Some have involved spring stroke-stop means which introduce uncertain operation and inaccuracies. Others have involved reciprocating devices whose stroke is hard to control. Many have used timing components which were not accurate and reliable.

According to the present invention an all-electric direct current timing pulse motor system is provided which has no springs or other mechanical biasing elements, has no switch contacts, has no reciprocating parts, which uses timing components of great accuracy, and which also can be readily adjusted or altered to vary the length of the timing pulses.

The invention provides an oscillatory drive motor responding to reversal of polarity and polarity reversing means responsive to D.C. power for operating mechanism for translating complete oscillations of the motor into movements of unit extent with cumulative elapsed time indicating effects.

The invention also provides an improved drive arrangement for converting oscillating rotary movement into unidirectional rotary movement.

The objects of the invention as well as certain features of novelty and advantages will be apparent from the following description of an exemplary embodiment, reference being made to the accompanying drawings, wherein:

FIG. 2 is an end view of an oscillating drive motor operated by pulses generated by the circuit means of FIG. 1;

FIG. 6 is a side elevation, partly in section of a time recording system driven by the motor;

FIG. 7 is a top plan view of a gear train, the view being taken on the line 7—7 of FIG. 6;

FIG. 9 is a plan view at a reduced scale of the oscillating drive motor of FIG. 2.

Figure 1:
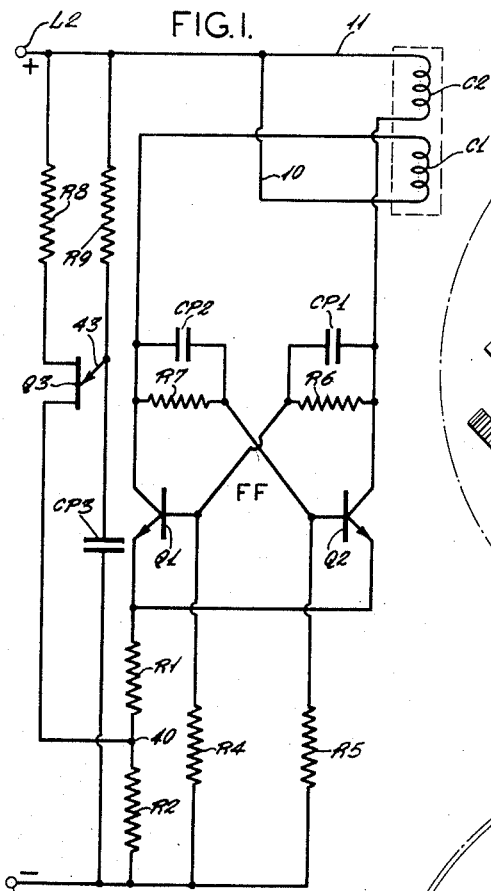
FIG. 1 is a circuit diagram showing means for producing precisely timed operating pulses from direct current power.
Figure 8:
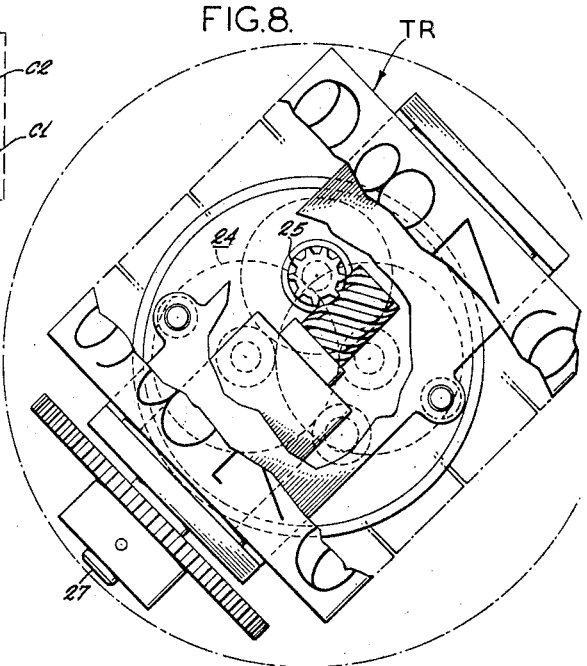
FIG. 8 is a right end elevation, partly in section, of a time recorder shown in FIG. 6.

In FIG. 1 direct current power terminals or lines are indicated by L1 and L2 with the polarities as marked on each. Terminal or line L2 is connected by conductor 10 to a motor armature coil C1 and connected by conductor 11 to a motor armature coil C2, which coils are thereby so connected that current flowing through the coils in the same direction will polarize the armature in opposite directions. The physical arrangement of the coils C1 and C2 may be seen in FIGS. 2 and 9 wherein it is seen that the coils are wound together on the armature spool or core 12 of a motor M having arms terminating in pole pieces P1, P2 which embrace the magnet rotor 13 having the polarities indicated. The magnet rotor 13 is mounted on a shaft 14 and through it, by means of a special drive and a suitable gear connection, drives the time recording mechanism generally indicated at TR in FIGS. 6 and 8. The energization and action of an oscillatory rotor motor are subject to very accurate control.

There is provided between the power terminal or line L1 and the coils C1 and C2 a flip-flop or bi-stable multivibrator circuit, generally indicated by FF and including paired transistors Q1, Q2 and associated circuitry. There are two outputs from the flip-flop representing the two possible states thereof, i.e., when the flip-flop is in one state the output is to coil C1 through the appropriate connection and when it is in the other state the output is through the other connection. As shown, the flip-flop is biased from line L2 and connected across the direct current terminals L1 and L2 through the coils C1 and C2 respectively.

A pulse-generating or switching circuit is connected to the trigger terminal of the flip-flop circuit. Here this circuit includes the emitter and collector of transistor Q3 and is connected to the positive terminal L2.

The triggering of the flip-flop is accomplished by unijunction transistor Q3 and its associated RC timing network R9, CP3. Capacitor CP3 is charged through resistor R9 until emitter point 43 reaches the peak point voltage of the unijunction transistor Q3 at which time transistor Q3 fires discharging capacitor CP3 through the transistor Q3 to its first base and through resistor R2 causing a pulse to develop across resistor R2. A bias is supplied to one base of transistor Q3 through biasing resistor R8.

By this arrangement, each time a pulse is generated by transistor Q3 and registered at the trigger point 40 the flip-flop circuit of Q1, Q2 changes state to conduct through the de-energized one of the armature coils C1, C2 and stop conduction through the other. Due to their opposite connections this change in the coil energized effects a reversal of the polarity of the pole pieces P1, P2 of the motor; and thereby the movement of the motor rotor or oscillator 13 is reversed.

Remembering that the windings C1 and C2 are so disposed on the core 12 that pulses flowing through the coils tend to polarize the magnetic core in opposite directions upon each change in the state of the flip-flop and that the core is of a nature to be readily demagnetized, the operation of the pulse generating and timing circuit of FIG. 1 and the oscillating motor driven thereby is as follows: Pulses are applied to the coils through the flip-flop unit FF, the outputs in different states of which are connected to different coils. Specifically, as explained, the collector of transistor Q1 is connected to the input of coil C1 and the collector of transistor Q2 is connected to the input of coil C2.

Direct current biasing potential is applied to the network across the terminals L1 and L2 to apply selected D.C. biasing potentials to the transistors of the flip-flop circuit. Biasing potential is applied through resistor R4 to the base of transistor Q1 and through resistor R5 to the base of transistor Q2. Similar biasing is accomplished for the emitters of the transistors through a common connection by resistors R1 and R2, together providing a voltage divider.

Triggering of the flip-flop occurs in a conventional manner as a pulse is applied at junction 40 of the voltage divider network to the respective emitters of the transistors Q1, Q2. Each successive pulse causes the flip-flop to change states and hence alternately causes conduction through transistor Q1 to coil C1 and through transistor Q2 to coil C2. Triggering operation of the flip-flop circuit continues in the way described at regularly timed intervals as long as the circuit remains active.

As an example, if the timing network generates pulses every .5 second then the rotor magnet has two modes every second and its shaft will make a complete back-and-forth oscillation each second. It will not matter whether each pulse of the two is exactly like the other so long as the two pulses together always measure the same exact time interval. This they do with great accuracy because of the circuit and oscillating rotor used. There are no switch contacts, drive springs, control springs or the like involved, the power drive to the oscillating motor being entirely electrical.

Figure 3:
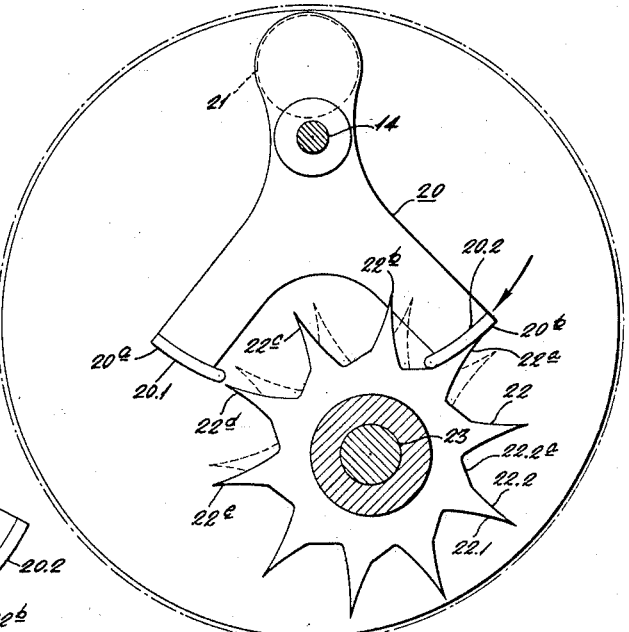
FIG. 3 is an end sectional view of drive mechanism operated by the motor, the view being taken on the line 3—3 of FIG. 6.

The drive from the oscillating motor shaft 14 to the time recorder TR includes, as shown in FIG. 3, a pawl 20 having a counterbalancing weight 21 and pawl fingers 20.1, 20.2 which operate a one-way drive star wheel 22 secured to drive shaft 23. The pawl structure 20 and the star wheel are each statically balanced so that no vibration can arise within either structure.

The shaft 23 drives a multiplying gear train 24 which through worm gears 25 drives the shaft 26 which operates the units shaft 27 of the time recorder TR. By using appropriate gear ratios between the shaft 23 and the time recorder mechanism TR it will be possible to record the sum of the motor shaft oscillations in units of elapsed time, the recorder shown being able to accumulate 9999 hours before repeating.

Figure 4:
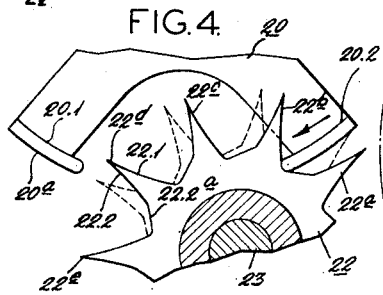
FIG. 4 is a fragmentary view like FIG. 3 but showing the parts in a different position.
Figure 5:
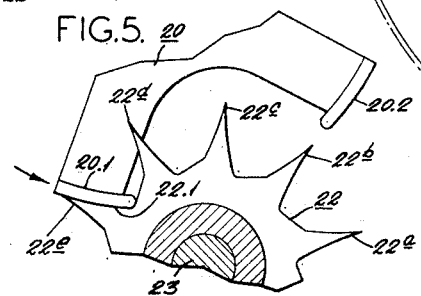
FIG. 5 is a fragmentary view like FIG. 3 but showing the parts in another position.

The operation of the pawl and star wheel device can be understood by reference to FIGS. 3, 4, and 5. Here some of the projections or teeth of the star wheel are designated at 22a, 22b, 22c, 22d for reference. The pawl fingers 20.1 and 20.2 have arcuate outer operating surfaces 20a, 20b respectively, which interact with the leading surface 22.1 and the trailing surface 22.2 of the teeth. The leading surface 22.1 is generally arcuate to fit the arcuate surface 20a of the finger 20.1 and the trailing surface 22.2 is generally arcuate for a distance to fit the arcuate surface 20b of the finger 20.2 but therebelow at 22.2a has a different shape and slope.

In the position of parts shown in FIG. 3 the finger 20.2 is moving down on the rear surface 22.2 of tooth 22a and by continued downward movement will engage the lower surface 22.2a to move the wheel forward and thereby move the point of tooth 22d past the end of finger 20.1. This advanced position is shown in dotted lines in FIG. 3 and in full lines in FIG. 4. Finger 20.2 will bottom here to limit the turning movement of the rotor 13 and shaft 14 in this direction.

Finger 20.1 next moves down along the trailing surfaces 22.2 and 22.2a of tooth 22d, as shown in FIG. 5, to move the star wheel around until the finger 20.2 is raised and located behind the next tooth 22b. Finger 20.1 bottoms here and against the leading edge 22.1 of tooth 22e to limit the movement of the rotor 13 and shaft 14 in the other direction.

The result is that star wheel 22 and shaft 23 are turned in steps in the same direction to rotate in one direction to transmit movements to the counter in the manner already described.

It is thus seen that the invention provides a simple, inexpensive yet very accurate and dependable arrangement for measuring elapsed time from a direct current power source and this without switch contacts or springs.

The drive arrangement of pawl and star wheel is one which operates very easily and requires very little power. The oscillating motor avoids reciprocating parts and since all parts are symmetrical it is stopped and started solely by pulse reversals and requires no mechanical springs or the like and is free from the effects of mechanical vibration. Since the rotor 13 is driven electrically in both directions there is a reduction in the instantaneous power required as compared to the instantaneous power which would be required if it were driven electrically in only one direction and returned by a spring.

While one embodiment of the invention has been described for purposes of illustration it is to be understood that there may be various embodiments and modifications within the scope of the invention.

I claim:

1. An elapsed time indicator, comprising in combination, a drive motor having an oscillating polarized rotor, an armature for said motor having a pair of coils wound thereon, a flip-flop circuit having alternate outputs for opposite states connected to the coils such that current flow will polarize the armature in one direction for one coil and in the opposite direction for the other, a pair of direct current terminals across which the coils and the flip-flop circuit are connected, and a pulse generating circuit connected to the flip-flop such that the pulse generator circuit generates a pulse actuating the flip-flop.

2. The elapsed time indicator of claim 1 in which the flip-flop is actuated by means of a resistor capacitor timing circuit, and an active element connected to the timing circuit and rendered conductive by the occurrence of a predetermined potential at a terminal of the active element rendering it conductive.

3. The elapsed time indicator of claim 2 in which the active element is a unijunction transistor whose emitter is coupled to the timing circuit between the series resistor and capacitor and one of whose base terminals is connected in the circuit with its emitter to permit a current flow through the transistor.

4. An elapsed time indicator comprising in combination, a drive motor having an oscillating rotor and shaft, spaced oscillating pawl fingers carried by said shaft and so arranged that when one is active the other is inactive, a one-way rotatable drive shaft, and a star wheel carried by said drive shaft in operative relationship with said pawl fingers, said star wheel having teeth provided with arcuate front and rear surfaces shaped to conform with the arcs of movement of said pawl fingers, and one of said surfaces having a surface portion along which one finger moves which is of a shape to carry the point of a tooth past the inactive finger which is out of contact with the star wheel, the fingers engaging said tooth surfaces to limit the oscillatory movements of said rotor.

5. An elapsed time indicator comprising in combination, a drive motor having an oscillating rotor and shaft, spaced oscillating pawl fingers carried by said shaft and so arranged that when one is active the other is inactive, a one-way rotatable drive shaft, and a star wheel carried by said drive shaft in operative relationship with said pawl fingers, said star wheel having teeth provided with front and rear surfaces shaped to conform with the arcs of movement of said pawl fingers, and one of said surfaces having a substantial change of slope relative to the pawl finger toward the base of the tooth which has a different slope from the surface nearer the point to carry the point of a tooth past the inactive finger which is out of contact with the star wheel, the finger bottoming on said surface toward the base to accomplish advance of the star wheel.

6. An elapsed time indicator comprising in combination, a drive motor having an oscillating rotor and shaft, said motor having a polarized rotor and an armature having windings polarizing the armature in opposite directions when energized, direct current terminals alternating impulses generating means connected to the coils and across the direct current terminals, spaced oscillating pawl fingers carried by said shaft and so arranged that when one is active the other is inactive, a one-way rotatable drive shaft, and a star wheel carried by said drive shaft in operative relationship with said pawl fingers, said star wheel having teeth provided with front and rear surfaces shaped to conform with the arcs of movement of said pawl fingers, and one of said surfaces having a surface portion along which one finger moves which is of a shape to carry the point of a tooth past the inactive finger which is out of contact with the star wheel, the fingers engaging said tooth surfaces to transmit to the star wheel a controlled stepwise advance from the oscillatory movements of said rotor.

References Cited by the Examiner

UNITED STATES PATENTS

| | | | |
|---|---|---|---|
| 1,725,203 | 8/29 | McNerney | 310—27 |
| 2,776,420 | 1/57 | Woll | 307—88.5 |
| 2,859,360 | 11/58 | Suran | 331—111 |

OTHER REFERENCES

Price, Charles H. Jr.: High-Current Solid-State Switches, Electronics, September 16, 1960, pp. 72–73.

MILTON O. HIRSHFIELD, *Primary Examiner.*